United States Patent [19]
McMillan et al.

[11] Patent Number: 5,455,211
[45] Date of Patent: Oct. 3, 1995

[54] METHODS OF MAKING NITRIDE GLASSES

[75] Inventors: Paul F. McMillan, Tempe; C. Austen Angell, Mesa, both of Ariz.; Tor Grande, Trondheim, Norway; John R. Holloway, Phoenix, Ariz.

[73] Assignee: Arizona Board of Regents acting on behalf of Arizona State University, Tempe, Ariz.

[21] Appl. No.: 229,656

[22] Filed: Apr. 19, 1994

[51] Int. Cl.$^6$ .................................. C03C 3/32; C03C 3/11
[52] U.S. Cl. .................................. 501/40; 501/45; 501/56; 501/96
[58] Field of Search ............................ 501/40, 41, 45, 501/56, 11, 96, 97, 98

[56] References Cited

U.S. PATENT DOCUMENTS

| | | | |
|---|---|---|---|
| 4,070,198 | 1/1978 | Chyung et al. | 501/56 |
| 4,546,372 | 10/1985 | Shuskus | 501/40 X |
| 4,806,160 | 2/1989 | Hagiwara et al. | 106/1.12 |
| 4,957,883 | 9/1990 | Kobayashi et al. | 501/56 X |
| 4,977,125 | 12/1990 | Lednor | 501/97 X |
| 5,006,142 | 4/1991 | Weidner et al. | 501/32 X |
| 5,229,336 | 7/1993 | Akiyama et al. | 501/56 |

*Primary Examiner*—Karl Group
*Attorney, Agent, or Firm*—Richard R. Mybeck

[57] ABSTRACT

The present invention relates generally to a novel and unique class of glassy materials and methods of making such materials in which substantially all of the anions are nitride ions, in contrast to the oxide ions of conventional optical glasses, or the fluoride ions of the more recently discovered fluoride optical glasses. The chemical nature of these new glasses dispose the glassy materials to a remarkable combination of desirable properties, including, but not limited to, high hardness, high refractive index and high softening temperature.

6 Claims, 5 Drawing Sheets

METHODS OF MAKING NITRIDE GLASSES

The present invention relates generally to a novel and unique class of bulk glassy materials in which substantially all of the anions are nitride ions, in contrast to the oxide ions of conventional optical glasses, or the fluoride ions of the more recently discovered fluoride optical glasses. Some of the work described herein was funded by NSF-MRG grant DMR91-21570. The United States government may have certain rights to this invention.

BACKGROUND TO THE INVENTION

In the field of optical materials, one of the critical needs has always been the provision of optically transparent glasses in which the refractive index reaches large values. High refractive index allows glass to bend transmitted light by large angles. The ability to achieve high refractive index is important in design of optical components such as lenses and prisms, and is especially valuable for optical matching, with minimal loss, to crystalline materials. Among the established oxide glasses known to obtain satisfactory optical quality, the refractive indices as listed in the Handbook of Physics and Chemistry usually lie in the range 1.6–1.7: only the heaviest flint glass has $n_D = 1.87$.

Another important property of an optical glass is that it should have a high softening temperature, so that it can remain stable in its dimensions despite excursions to quite high temperatures. It should not have any physical ageing processes which would allow the structure to slowly change thereby allowing critical design dimensions to change. It should be resistant to air and atmospheric moisture so that optical surfaces are not degraded during normal utilization. Still another important property that such an optical glass should have is a high hardness, so that an optical surface, once formed, will successfully resist damage on impact with hard objects and resist abrasion by airborne dust particles which typically have hardnesses in the range of ordinary silicate glasses. The material which combines all these properties in an extreme form is, of course, crystalline diamond. No glassy materials have heretofore been known in which all these desirable properties occur together.

Very large values of the refractive index, even greater than $n=2.0$, have been obtained by the use of elements like selenium or tellurium, as the major species in the glass. However, these glasses are semiconducting in nature and are black in color, i.e., they absorb light in the visible region of the spectrum, and are suitable only for infrared optics applications. These high index glasses also have very low softening temperatures and hardnesses, which are serious disadvantages in most applications.

Better properties are obtained by replacing the selenium and tellurium with sulfur. Such sulfide glasses may also retain the optical transparency of conventional oxide glasses, hence are attractive for special purpose applications. However, these ionic sulfide glasses are much more prone to attack by atmospheric moisture than are the oxide glasses and suffer from much lower softening temperatures and lower hardnesses than do the oxide glasses.

Attempts to solve the problem posed by lack of optically transparent glasses of high refractive index have also been made by altering the composition of oxide glasses so as to include large proportions of heavy metal cations and heavy metal glassformers. For instance, the calcium oxide of normal "soda-lime silicate" glass is replaced by lead (and, indeed, as a major component in the well known lead crystal glasses is responsible for their aesthetic qualities which are a direct consequence of the high refractive indices of those glasses). In other variations, the sodium oxide is replaced by silver or thallium oxide, while the "glassformer" $SiO_2$ is replaced by oxides such as $Bi_2O_3$ or $As_2O_3$. By such replacements, oxide glasses with extremely high refractive indices have been obtained (see, e.g. W. Dumbaugh and J. Laupp, in the *J. American Ceramic Soc.*, vol. 75, pp. 2315–2326 (1992)). However, the high refractive index is obtained in these oxide glasses at the cost of greatly lowered softening temperatures, generally in the range 300°–450° C. One glass of this type containing germanium oxide along with lead and bismuth oxide was shown to have a softening temperature of 470° C. but the refractive index was decreased to 1.94.

Further attempts to improve the glass properties have been made by replacing the oxide ions in the silicate or phosphate glass-forming system by nitride ions, as described in U.S. Pat. No. 4,070,198, Chyung et al. and by S. Sakka, in the *Annual Review of Materials science*, vol. 16, p. 29 (1986). This procedure has the desired results of simultaneously raising the glass transformation temperature and hardness of the glassy material, along with its refractive index. However, none of these previous efforts was able to replace more than 20–25 atomic per cent of the initial oxygen anions with nitrogen.

Thus it is readily apparent that a great need exists for the development of a new type of glassy material in which all four of the desiderata listed above: high refractive index, high softening temperature, resistance to air and moisture, and high hardness, are obtained. It is towards this goal that the present invention is directed. A preferred embodiment of the present invention obtains all of the desiderata listed above, and furthermore may in principle be produced by methodology much simpler than those previously used to produce currently available examples of the material.

BRIEF SUMMARY OF THE INVENTION

The present invention relates to a novel family of glassy materials which obtain a high refractive index, and simultaneously obtain high values of hardness and softening temperature. These materials are created by replacing the oxide ions in an oxide glassforming system (for instance the pure oxide $P_2O_5$) or in a mixed oxide glassforming system (for instance an alkali calcium phosphate) largely or entirely by nitride ions. In a preferred embodiment, a liquid melt of lithium nitride, $Li_3N$, calcium nitride, $Ca_3N_2$, and triphosphorous pentanitride, $P_3N_5$, is obtained by fusing the pure ingredients under a high pressure of nitrogen, up to 14 kilobar, and at a high temperature, up to 1400° C., followed by cooling rapidly to room temperature. The resulting glassy material, which may be obtained in a range of compositions hereinafter described in detail, obtains a previously unheard of combination of the desirable properties listed above, namely, (a) transparency in the greater part of the visible region of the electromagnetic spectrum (some absorption of light with blue wavelengths may be observed), (b) refractive indices which are greater than 1.95 and often exceed 2.00, (c) hardnesses which exceed that of vitreous silica, (which has hardness of 4.9 on Mohs' scale, See: *C.R.C. Handbook of Chemistry and Physics*, 60th Edition, 1979–80, page F-80.) and (d) softening temperatures which exceed 750° C. While one or more of the above properties has been heretofore obtainable in some of the glasses known to date, no glass has heretofore been developed in which all of these properties are obtained in the same material.

Accordingly a principal object of the present invention is to provide a new and improved transparent glassy material having unexpectedly high values of the refractive index.

Another object of the present invention is to provide methodology for producing a monolithic bulk glass containing only nitride ions and containing none of the anions usually contained in glassy materials used in optical materials such as oxide, sulfide or other chalcogenide, or fluoride or other halide ions, and which contains such nitride anions in a substantially large proportion relative to that of any of the other familiar glass anions than has heretofore been attainable.

Still another object of the present invention is to provide a means of obtaining a novel and unique transparent glassy material which combines a remarkably high value of the refractive index with a high value of the hardness.

A still further object of the present invention is to provide a transparent glassy material which combines high values of the refractive index with high hardness and high softening temperature.

These and still further objects as shall hereinafter appear are readily fulfilled by the present invention in a remarkably unexpected manner as will be readily discerned from the following detailed description of the preferred embodiment when read in conjunction with the accompanying drawings.

DESCRIPTION OF THE PREFERRED EMBODIMENTS

Figure 1:
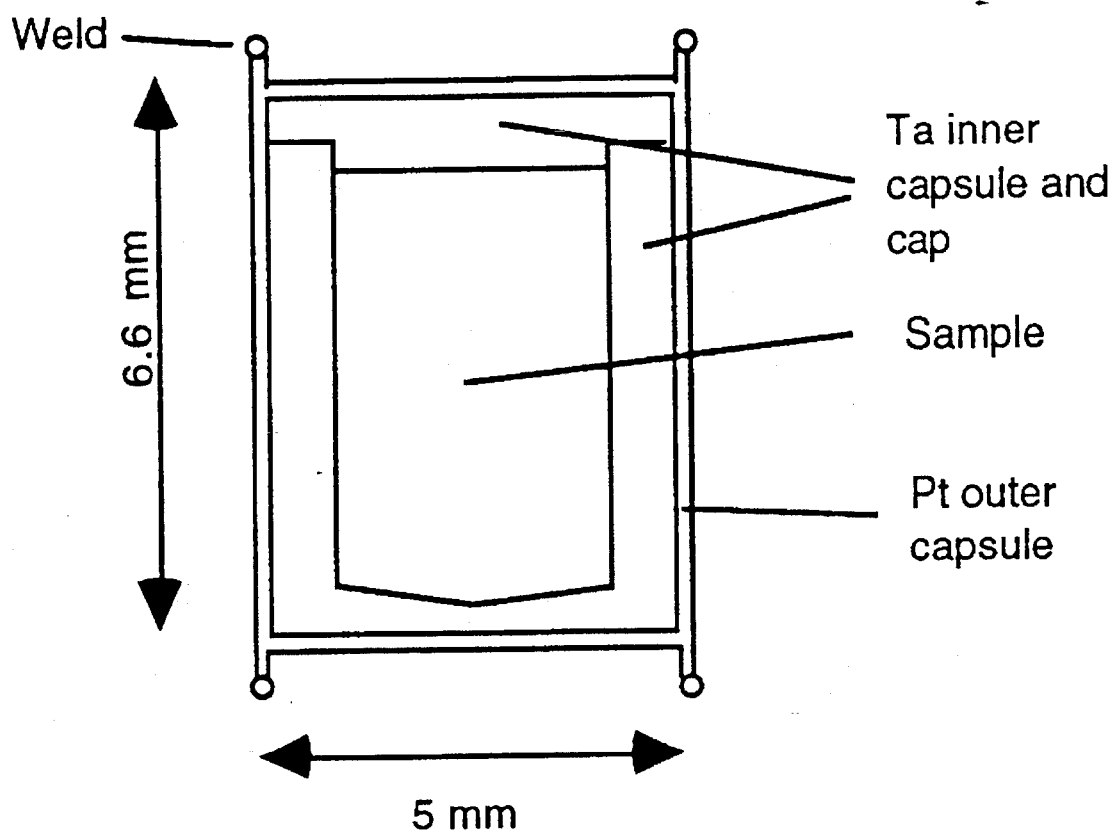
FIG. 1a is a schematic diagram of a Ta(Mo) capsule with caps placed inside the Pt capsule.
FIG. 1b is a cross-sectional view of the cylindrical furnace assembly furnace assembly with the sample capsule disposed therein.
FIG. 1c is a schematic view of the piston-cylinder high pressure-high temperature device in which the unreacted mixture of ingredients is placed before pressurizing and heating to form the liquid melt in accordance with the present invention.
Figure 1:
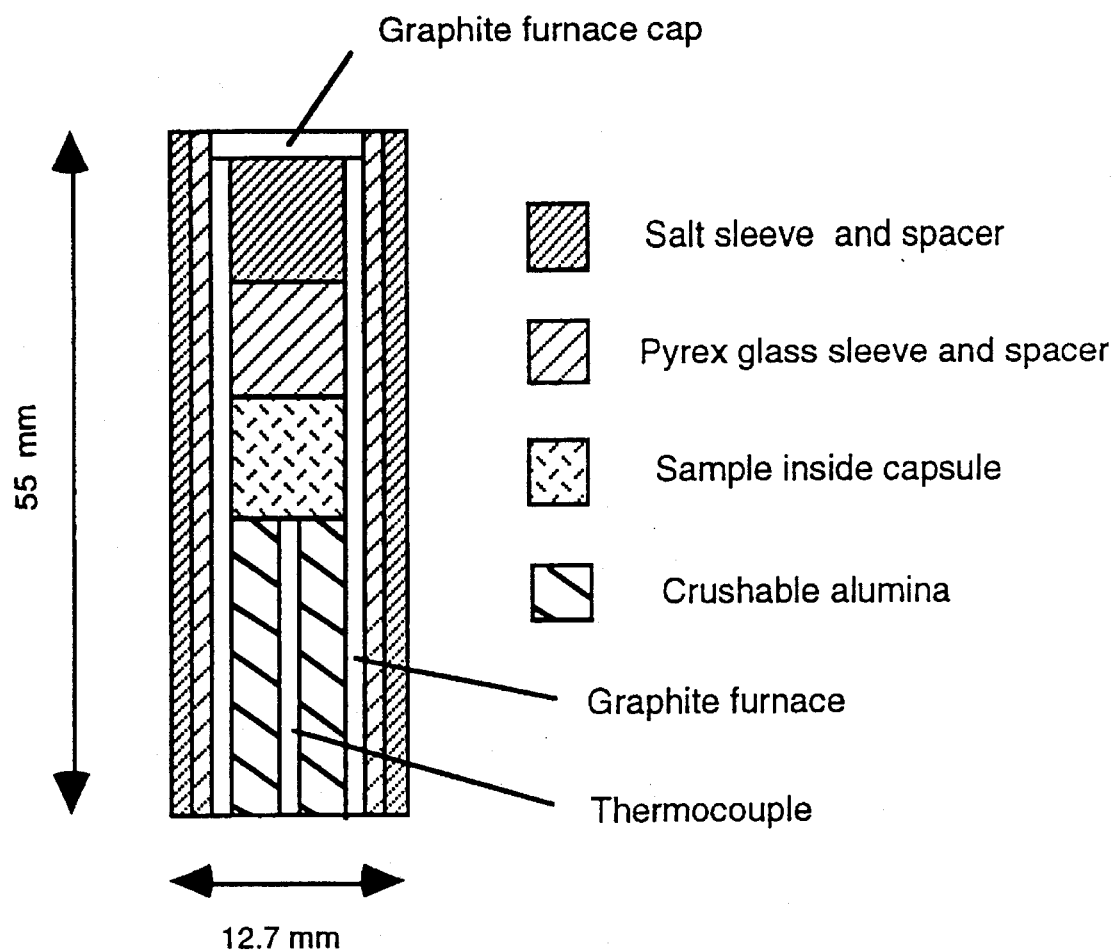
Figure 1:
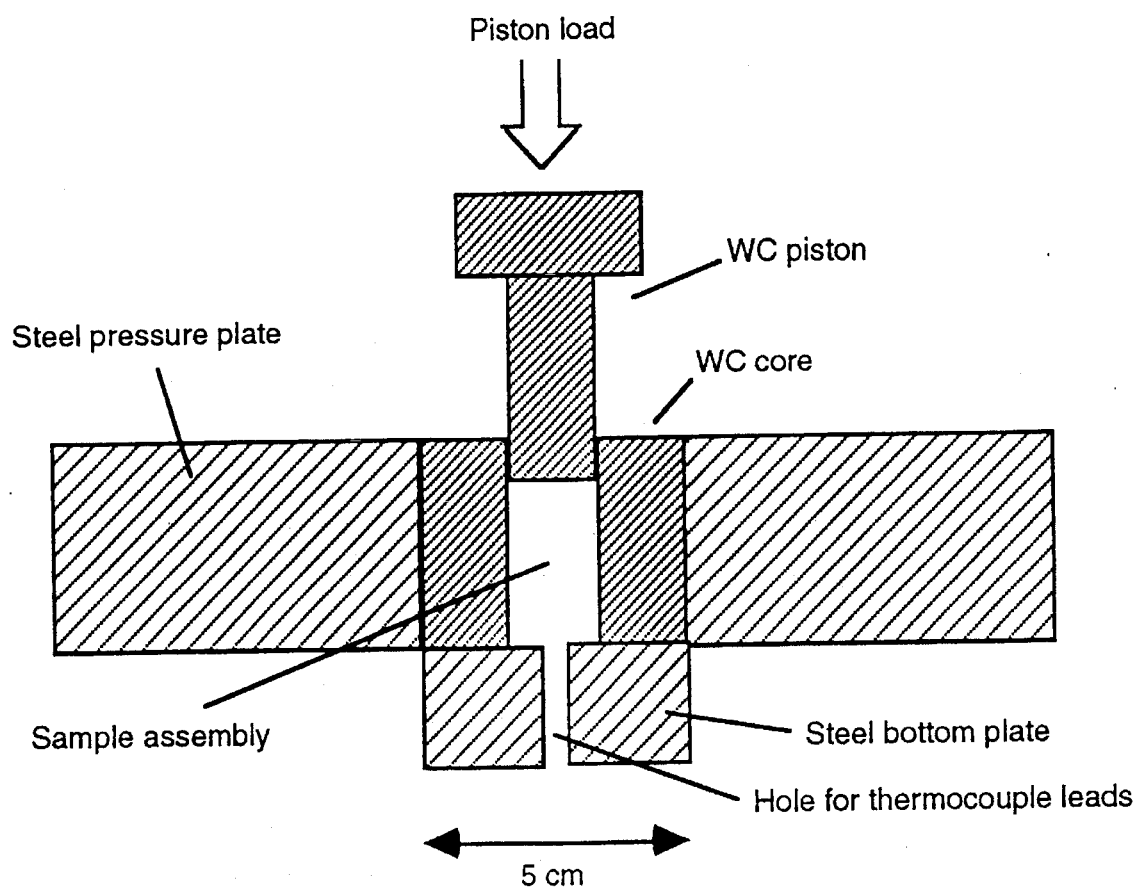

The present invention relates to novel nitride glass formulations and methods of preparing the same. The essential and distinct feature of the new glassy material is the high content of nitrogen and the low content of oxygen compared with glassy materials heretofore obtainable. The preferred embodiment of the present invention contains not less than 50% of the anionic component of the glass as nitride anion, $N^{3-}$, i.e. [O]:[N]<0.5, and may contain up to 100% nitride anions i.e. [O]:[N]=0. The high nitride anion content is found desirable to maximize the refractive index, and also to increase the hardness and the softening temperature of the resulting glass.

The commercially available reagent grade compounds ($Li_3N$, $Ca_3N_2$, $Ba_3N_2$, $P_3N_5$, $Si_3N_4$) used in the preparation of the glasses of the present invention were obtained from Johnson Matthey, Ward Hill, MA. Further samples of $P_3N_5$, and the samples of $PN_2H$, $PNH_2$, and intermediate hydrogen-bearing compounds, were synthesized using the standard procedures described by D. Sowerby and L. Audrieth, (*Chemisches Berichte*, vol. 94, p. 2670 (1961)), which involved reacting $PNCl_2$ in liquid ammonia, and subsequent heat treatment at temperatures between 300° C. and 750° C. (W. Schnick, *Angewandte Chemie, International Edition*, vol. 32, p. 806 (1993)). Impure samples of $P_3N_5$ containing an unknown amount of oxygen obtained from Johnson Matthey were suitable for making oxynitride glasses of nitride content higher than heretofore obtainable, but are unsuitable for producing pure nitride glasses.

$Li_3N$ is the only stable alkali metal nitride, so only lithium, of all of the alkali metal nitrides could be introduced directly. Glasses containing other alkalis can be produced when the azide, e.g. $NaN_3$, is used as starting material. Also glasses embodying this invention can be produced using barium nitride in place of calcium nitride. Some of the phosphorus nitride may also be replaced with other nitrides such as those of silicon, boron and aluminum, although these ingredients should not be used in excess because they adversely affect other properties of the final product.

Refractive indices of the glasses obtained in the practice of this invention were measured by the well-known oil immersion method while hardness was measured quantitatively by testing the ability to scratch (i) a silica glass plate (Moh hardness 4.9), and (ii) fresh surfaces of various crystalline minerals, including (a) dolomite (hardness 4), (b) actinolite (hardness 5–6), (c) feldspar (hardness 6), and (d) pure quartz (hardness 7).

The softening temperature and thermal stability of the glasses at normal atmospheric pressure were determined by visible observations on a hot stage microscope and by differential thermal analysis.

The chemical compositions were verified by chemical analysis, using standard chemical methods, and electron and ion probe microanalysis.

The structural state of the glasses was further defined by infrared spectroscopy and by laser light scattering (Raman) techniques, and by nuclear magnetic resonance spectroscopy.

Suitable equipment for the practice of the present invention is shown in FIGS. 1a, 1b and 1c. Specifically FIG. 1 is a diagram showing the design of the crucible and capsule in which the unreacted mixture of ingredients was placed before pressurizing and heating to form the liquid melt. (a) shows the inner crucible of Ta or Mo with its tightly fitting lid, inside a Pt capsule, welded shut. The unreacted materials are placed inside this crucible and capsule assembly. (b) shows the pressurization assembly used in the high temperature, high pressure synthesis. The salt, glass and crushable alumina components serve to transmit pressure to the sample, contained inside its crucible and capsule assembly. The graphite heater, shown clear of cross-hatching, is used to heat the sample by passing an electrical current through the graphite. Temperature is measured via the thermocouple. (c) shows a sketch of the piston-in-cylinder pressurization apparatus, as described by Holloway and Wood (1988).

In one practice of the present invention, high pressure techniques are used to prevent the loss of nitrogen during fusion of the ingredients and to obtain a homogeneous melt from which the glass is formed by cooling. One type of sealed crucible found suitable for the melting of the nitride and oxynitride glasses of this invention is made of tantalum or molybdenum and is shown in FIG. 1a. After the ingredients are weighed into this crucible, using a dry box to protect against ingress of atmospheric oxygen, the entire crucible is sealed into an outer jacket of platinum and placed within a cylindrical graphite heater as shown in FIG. 1b. The graphite heater is supported by ceramic parts and surrounded by pressed sodium chloride and acts as a pressure medium. The entire assembly is pressurized and heated in a piston cylinder high pressure device of the type described by J. Holloway and B. Wood ("Simulating the Earth: Experimental Geochemistry", Unwin Hyman, Boston, 1988) and commonly used in geochemical studies and shown in FIG. 1c.

In a typical practice of the invention, appropriate combinations of $Li_3N$, $Ca_3N_2$ and $P_3N_5$ are mixed together and sealed into a tantalum crucible within a platinum enclosure of the type described above and shown in FIG. 1a. The mixture is then heated at 1000° C. at 10 kbar pressure for 30 min to pre-react the components, which are then fused at 1400° C. and 8 kbar pressure for 20 min, followed by quenching to room temperature at a rate of 100° C./min by turning off the power to the furnace. A glassy material is produced and, upon opening the crucible, is removed for performance testing as described above. Glass was also produced for various mixtures containing only $Li_3N$ and $P_3N_5$, with no $Ca_3N_2$ present. All of the glass produced hereby was stable in air.

In another practice of the present invention, impure commercial $P_3N_5$ containing up to approximately 20 atomic per cent oxygen is used following the above procedure and produced a glassy material lighter in color than that of the purely nitride glasses. The nitrogen content of this oxynitride glass is much greater than that obtainable in previously known bulk phosphorous oxynitride glasses.

In other practices of the present invention, $Ca_3N_2$ was replaced by $Ba_3N_2$, and glass was produced using the above described procedures; and, in another, a part of the $P_3N_5$ was replaced by $Si_3N_4$, and glass was produced using the above procedure.

In a modification of the present invention, amorphous or crystalline powders containing hydrogen (H), phosphorous (P) and nitrogen (N), or H, P and N along with other components including, but not limited to, Li, Na, and Ca, were heated under high pressure, to lower temperatures (circa 650°–750° C. at 6–8 kbars) and produced dense amorphous materials which contained various combinations of these light elements.

Referring back to FIG. 1 which presents a diagram showing the design of the crucible and capsule in which the unreacted mixture of ingredients is placed before pressurizing and heating to form the liquid melt. FIG. 1a shows the tantalum or molybdenum capsule with cap. The sample is placed in the capsule which is sealed inside the platinum capsule, and welded shut. FIG. 1b shows a cross sectional view of the cylindrical furnace assembly used to surround and contain the Pt and Ta(Mo) sample enclosure during the high pressure synthesis. The sample crucible is packed above and below by crushable alumina and pyrex glass and a cylindrical plug of pressed salt (NaCl). The temperature is measured by a $Pt-Pt_{90}Rh_{10}$ thermocouple led through the crushable alumina rod, in contact with the sample capsule from below. The sample assembly is surrounded by a cylindrical graphite resistance heater and cap, shown clear of cross-hatching. The whole is supported by a pyrex glass sleeve, and cylinder of pressed salt, which acts as pressure transmitting medium. FIG. 1c shows a cross sectional view of the high pressure device. The sample and heater assembly shown in FIG. 1b are placed within the cylindrical WC core, which is press-fit into the steel pressure plate (as described by J. Holloway and B. Wood, ibid). A uniaxial force is then applied by using oil pressure to force the steel piston on to the sample assembly. High temperatures are achieved by passing electrical current through the graphite furnace, from electrical connection wires led through a hole in the steel base plug (shown hatched at bottom the drawing).

Figure 2:
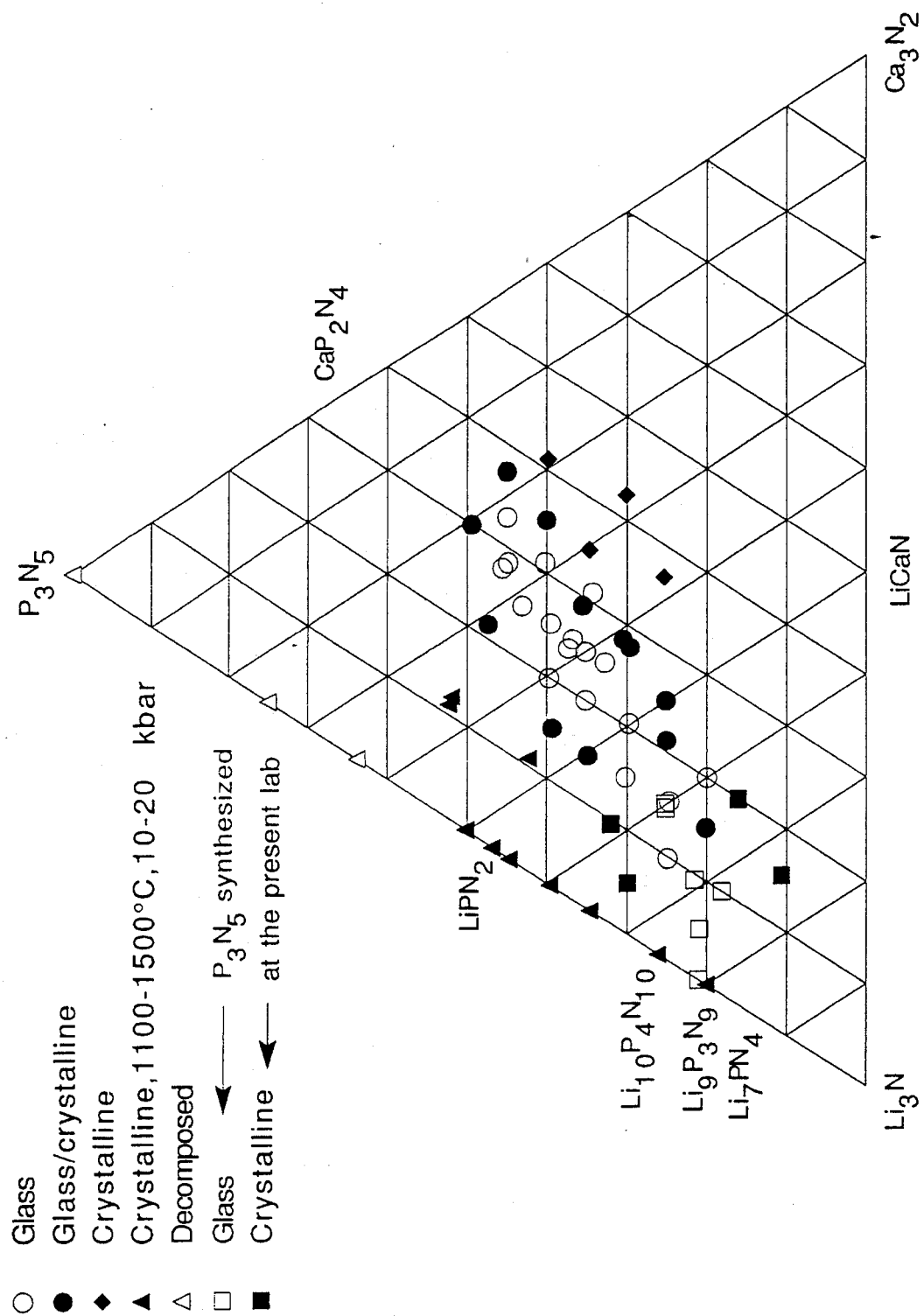
FIG. 2 is a diagram showing the composition range of the ternary system $Li_3N$—$Ca_3N_2$—$P_3N_5$ which forms glassy materials embodying the present invention.
Figure 3:
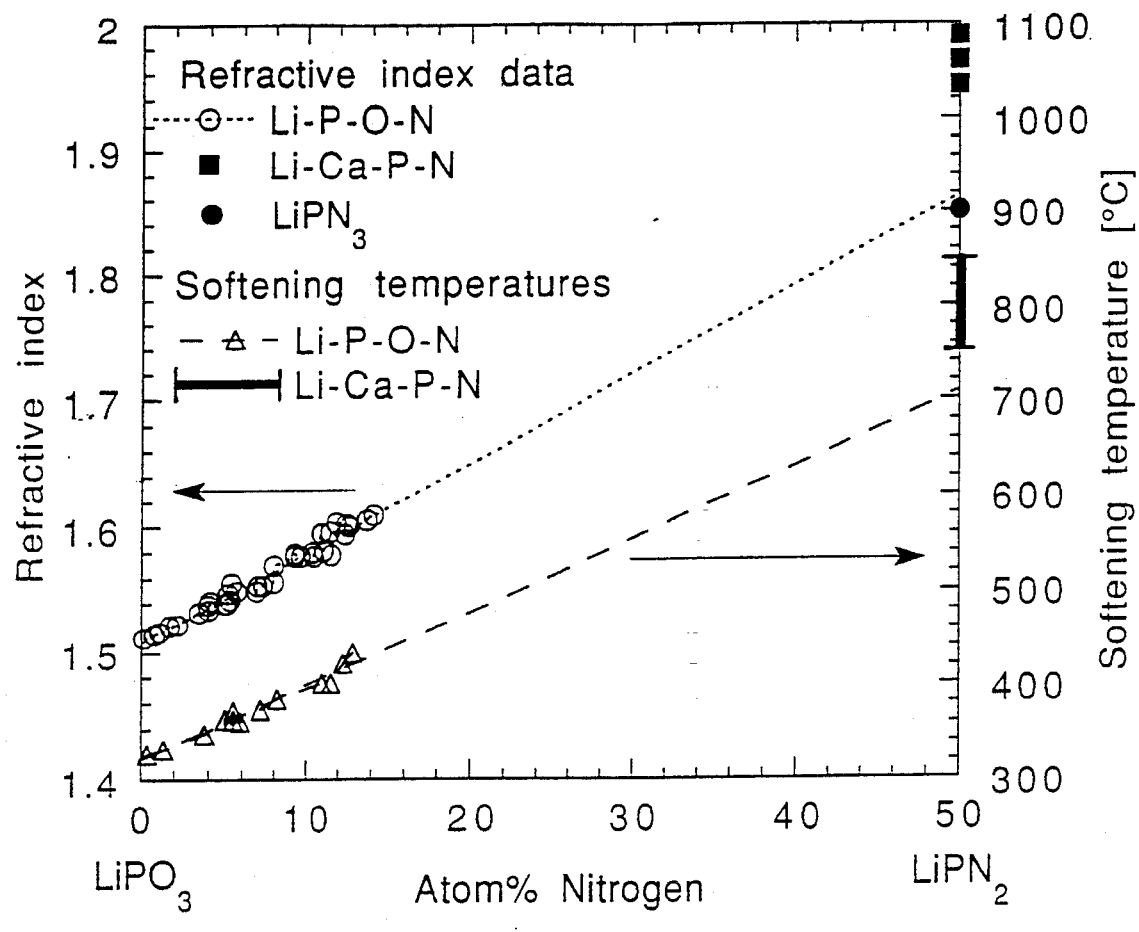
FIG. 3 is a diagram displaying the values of refractive index and softening temperature obtained by the nitride glasses in the ternary system $Li_3N$—$Ca_3N_2$—$P_3N_5$ of this invention, in comparison with the highest values obtained by prior art.

FIG. 2 shows the composition range of the ternary system $Li_3N$—$Ca_3N_2$—$P_3N_5$ which forms glassy materials obtained for the first time by the present invention. Glass-forming compositions have also been produced containing $Ba_3N_2$ instead of $Ca_3N_2$, and with $Si_3N_4$ in the place of $P_3N_5$ using the present invention. Additional glass-forming compositions containing only P, N and H have also been produced having, compositions ranging from $P_3N_5$ to $PNH_2$ and $PN_2H$, all in accordance with the present invention. FIG. 3 shows the values of refractive index and softening temperature obtained by the nitride glasses in the ternary system $Li_3N$—$Ca_3N_2$—$P_3N_5$ in comparison with the highest values obtained by glasses prepared by prior art techniques.

Referring back to FIG. 2, the samples marked with triangles and diamonds were quenched from higher pressures in the region 10–20 kbar and from temperatures in the region 1100°–1500° C. These were the initial experiments carried out to search for the best glass forming conditions. Specimens quenched from 1500° C. samples with > 50 mol% $P_3N_5$ decomposed to a superficial fluid phase of nitrogen retained in the capsule and elemental P. Samples with more than 90 vol % glass are shown as open spheres, while samples with 90 vol % or more crystalline material are given as filled squares in the figure. The compositions of ten samples were confirmed by electron micro-probe analysis (wavelength and energy dispersive modes), and further supported in one case by Rutherford back scattering (RBS). Up to 1.5 at % Mo or Ta was found in some but not all of the samples. No oxygen was found to be present in the samples, within analytical error ($\pm 1-2\%$).

To further aid in the understanding of the present invention, and not by way of limitation, the following examples are presented.

EXAMPLE 1

0.006 g of $Li_3N$, 0.020 g of $Ca_3N_2$, and 0.029 g of pure $P_3N_5$ were mixed and sealed into a tantalum crucible of the type described above and shown in FIG. 1. The mixture was pre-heated at 1000° C. and 10 kbar pressure for 30 min, then fused at 1400° C. and 8 kbar pressure for 20 min, followed by isobarically quenching to room temperature at ~100°/s by switching off the power to the furnace. The refractive index of the resulting glassy product exceeded to 2.00 when measured by immersing in oils of known refractive index. The hardness was greater than that of vitreous $SiO_2$ because the latter was scratched on abrading with the nitride glass, but less than that of feldspar, that is, nitride glass produced hereby has a hardness of close to 5 on Moh's scale, or approximately 280 on the Knoop hardness scale. The softening temperature was above 750° C. because the glass fragments were heated to above 750° C. without any deformation or other alteration of the fragment being observed. Further, no devitrification occurred according to subsequent X-ray investigation. Crystallization of this glass does not occur until the temperature exceeds 900° C. Decomposition began at 930° C.

EXAMPLE 2

Using the procedure of EXAMPLE 1, 0.022 g of $Li_3N$ and 0.030 g of $P_3N_5$ were mixed and sealed into a tantalum crucible, pre-heated at 1000° C. and 10 kbar pressure for 30 min, then fused at 1400° C. and 8 kbar pressure for 20 min.

The melt was quenched to room temperature and formed a transparent glass. The refractive index of the glassy product was equal to 1.85, and the hardness was greater than that of vitreous $SiO_2$. The softening temperature was 700°–750° C.

EXAMPLE 3

Using the procedure of EXAMPLE 1, 0.019 g of $Li_3N$, 0.012 g of $Ca_3N_2$, and 0.023 g of $P_3N_5$ were mixed and sealed into a tantalum crucible, pre-heated at 1000° C. and 10 kbar pressure for 30 min, then fused at 1400° C. and 8 kbar pressure for 20 min. The melt was quenched to room temperature and formed a transparent glass having a refractive index of 1.97, a hardness greater than that of vitreous $SiO_2$, and a softening temperature above 750° C.

EXAMPLE 4

Using the procedure of EXAMPLE 1, 0.011 g of $Li_3N$, 0.012 g of $Ca_3N_2$, and 0.027 g of $P_3N_5$ were mixed and sealed into a tantalum crucible, pre-heated at 1000° C. and 10 kbar pressure for 30 min, then fused at 1400° C. and 8 kbar pressure for 20 min. The melt was quenched to room temperature and formed a transparent glass having a refractive index of 1.98, and a hardness greater than that of vitreous $SiO_2$. The softening temperature of the product was above 750° C.

EXAMPLE 5

Using the procedure of EXAMPLE 1, 0.005 g of $Li_3N$, 0.022 g of $Ca_3N_2$, and 0.026 g of $P_3N_5$ were mixed and sealed into a tantalum crucible, pre-heated at 1000° C. and 10 kbar pressure for 30 min, then fused at 1400° C. and 8 kbar pressure for 20 min. The melt was quenched to room temperature and formed a transparent glass. The refractive index of the glassy product was greater than 2.00, and the hardness was greater than that of vitreous $SiO_2$. The softening temperature was above 750° C.

EXAMPLE 6

Using the procedure of EXAMPLE 1, 0.003 g of $Li_3N$, 0.020 g of $Ca_3N_2$, and 0.029 g of $P_3N_5$ were mixed and sealed into a tantalum crucible, pre-heated at 1000° C. and 10 kbar pressure for 30 min, then fused at 1400° C. and 8 kbar pressure for 20 min. The melt was quenched to room temperature and formed a transparent glass. The refractive index of the glassy product was greater than 2.00, and the hardness was greater than that of vitreous $SiO_2$. The softening temperature was above 750° C.

EXAMPLE 7

Using the procedure of EXAMPLE 1, 0.007 g of $Li_3N$, 0.014 g of $Ca_3N_2$, and 0.032 g of $P_3N_5$ were mixed and sealed into a tantalum crucible, pre-heated at 1000° C. and 10 kbar pressure for 30 min, then fused at 1400° C. and 8 kbar pressure for 20 min. The melt was quenched to room temperature and formed a transparent glass. The refractive index of the glassy product was greater than 2.00, and the hardness was greater than that of vitreous $SiO_2$. The softening temperature was above 750° C.

EXAMPLE 8

In another practice of the invention, 0.009 g of $Li_3N$, 0.027 g of $Ba_3N_2$, and 0.017 g of $P_3N_5$ were mixed and sealed into a tantalum crucible, pre-heated at 1000° C. and 17 kbar pressure for 30 min, then fused at 1400° C. and 17 kbar pressure for 20 min. The melt was quenched to room temperature and formed a transparent glass, orange in color. The refractive index of the glassy product was 1.93.

EXAMPLE 9

Using the procedure of EXAMPLE 1, 0.016 g of $Li_3N$, 0.010 g of $Ca_3N_2$, 0.023 g of $P_3N_5$, and 0.005 g of $Si_3N_4$ were mixed and sealed into a tantalum crucible, pre-heated at 1000° C. and 10 kbar pressure for 30 min, then fused at 1400° C. and 8 kbar pressure for 20 min. A homogeneous, transparent glassy material was obtained.

EXAMPLE 10

Using the procedure of EXAMPLE 1, 0.013 g of $Li_3N$, 0.009 g of $Ca_3N_2$, 0.014 g of $P_3N_5$, and 0.008 g of $Si_3N_4$ were mixed and sealed into a tantalum crucible, pre-heated at 1000° C. and 10 kbar pressure for 30 min, then fused at 1400° C. and 8 kbar pressure for 20 min. A homogeneous, transparent glassy material was produced, which was harder than vitreous $SiO_2$.

EXAMPLE 11

In another practice of the invention, 0.004 g of $Li_3N$, 0.029 g of $Ba_3N_2$, and 0.024 g of an impure sample of $P_3N_5$ obtained from Johnson-Matthey, containing 10–20% oxygen as impurity, were mixed and sealed into a tantalum crucible, pre-heated at 1000° C. and 15 kbar pressure for 30 min, then fused at 1400° C. and 15 kbar pressure for 20 min. An inhomogeneous glass containing dark brown and clear regions was obtained. The composition of the light region corresponded to glassy $LiPN_2$ containing 1.5 mole % $LiPO_3$ component, and the dark region had composition $Ba_7Li_{41}P_{10}N_{21}O_{21}$, corresponding to an oxynitride glass with 50% replacement of the O by N.

EXAMPLE 12

Using the procedure of EXAMPLE 1, 0.006 g of $Li_3N$, 0.024 g of $Ba_3N_2$, and 0.024 g of an impure sample of $P_3N_5$ containing oxygen, were mixed and sealed into a tantalum crucible, pre-heated at 1000° C. and 15 kbar pressure for 30 min, then fused at 1400° C. and 15 kbar pressure for 20 min. A brown glass was obtained with composition $Ba_6Li_{38}P_{12}N_{24}O_{19}$, corresponding to an oxynitride glass with more than 50% replacement of the O by N. The refractive index of this glass was 1.775.

EXAMPLE 13

Using the procedure of EXAMPLE 1, 0.004 g of $Li_3N$, 0.039 g of $Ba_3N_2$, and 0.023 g of an impure sample of $P_3N_5$ (as described in Example 12), were mixed and sealed into a tantalum crucible, pre-heated at 1000° C. and 15 kbar pressure for 30 min, then fused at 1400° C. and 15 kbar pressure for 20 min. An inhomogeneous brown glass was obtained, with composition continuously variable between $Ba_5Li_{55}P_7N_{13}O_{20}$ and $Ba_5Li_{48}P_7N_{11}O_{26}$, corresponding to a range of oxynitride glasses with high nitrogen content.

EXAMPLE 14

Using the procedure of EXAMPLE 1, powdered amorphous material having an approximate chemical composition $HPN_2$ corresponding to that of the crystalline material phospham (PN(NH)), was prepared from $PNCl_2$ by a conventional chemical route as described above. 0.025 g of the amorphous material was sealed into a tantalum crucible as shown in FIG. 1a, b and c and heated to 700° C. at 25 kbar pressure for four hours, and then quenched to room temperature. On opening the capsule, a dense, transparent glassy material containing only phosphorous, nitrogen and hydrogen was found, having an N:P ratio of about 2. Infrared spectroscopy revealed a large signal indicating substantial hydrogen bound to nitrogen, in a similar amount to that present in the crystalline material with chemical composition $HPN_2$.

EXAMPLE 15

Using the procedure of EXAMPLE 14, a powdered amorphous material having the approximate chemical composition $HPN_2$ was prepared. 0.026 g of this amorphous material was then sealed into a tantalum crucible, heated to 700° C. at 5 kbar pressure for 30 minutes, and then quenched to room temperature to produce a dense, transparent glassy material having the approximate chemical composition of $HPN_2$.

EXAMPLE 16

In another, special, practice of the invention, powdered amorphous material with approximate chemical composition $P_3N_5$ was prepared from $PNCl_2$ by a conventional chemical route as described above. 0.024 g of this material was sealed into a tantalum crucible, heated to 650° C. at 20 kbar pressure for four hours, then quenched to room temperature to produce a dense, homogeneous, transparent glassy material.

EXAMPLE 17

Using the procedure of EXAMPLE 16, powdered amorphous material with approximate chemical composition $P_3N_5$ was prepared and 0.023 g of this material were sealed into a tantalum crucible, heated to 700° C. at 20 kbar pressure for 30 minutes, and then quenched to room temperature to produce a dense, homogeneous, transparent glassy material.

From the foregoing, it is readily apparent that a useful embodiment of the present invention has been herein described and illustrated which fulfills all the aforestated objectives in a remarkable unexpected fashion. It is of course understood that such modifications, alterations and adaptations as may readily occur to the artisan confronted with this disclosure are intended within the spirit of this disclosure, which is limited only by the scope of the claims appended hereto.

Accordingly, what is claimed is:

1. A method of producing an optical glass containing nitride anions as the principal anionic ingredient, comprising admixing phosphorous nitride with other nitrides selected from the group consisting of calcium, barium, lithium, silicon, sodium, and mixtures thereof; heating said mixture to a temperature of at least 650° C. but not more than 1400° C. at a pressure of at least five kilobars but not more than 25 kilobars in a sealed crucible to form a homogeneous mass; and cooling said homogeneous mass to room temperature to yield optical glass.

2. A method according to claim 1 in which said phosphorous nitride is impure.

3. A method for preparing a bulk amorphous material comprising heating a compound selected from the group consisting of phosphorous nitride and hydrogenated phosphorous nitride to a temperature greater that 500° C. but not more than 750° C. in an airtight crucible until said compound becomes a monolithic amorphous material; and quenching said amorphous material to room temperature.

4. A method for preparing a bulk amorphous material according to claim 3 in which said compound for heating is a mixture of phosphorous nitride and hydrogenated phosphorous nitride.

5. A method for preparing a bulk amorphous material according to claim 4, further comprising simultaneously heating said compound to a temperature of at least 500° C. but not greater that 750° C. at a pressure of at least 5 kilobars but not more than 25 kilobars.

6. A method according to claim 3 in which said compound is heated under a pressure of at least 5 kilobars but not more that 25 kilobars.

* * * * *